Dec. 5, 1939.  W. BRAUER  2,182,278
VALVE LOCKING DEVICE

Filed May 1, 1937

Inventor
Walter Brauer

By Edward D Hardway
Attorney

Patented Dec. 5, 1939

2,182,278

UNITED STATES PATENT OFFICE 2,182,278

VALVE LOCKING DEVICE

Walter Brauer, Oklahoma City, Okla.

Application May 1, 1937, Serial No. 140,098

1 Claim. (Cl. 251—144)

This invention relates to a valve locking device and has particular relation to novel means for releasably securing a valve assembly in position in a conduit.

The invention is particularly applicable for locking the valve assembly in the conduit through a drill pipe float joint or through a drill collar, casing shoe or other pipe collar or coupling.

Another object of the invention is to provide novel means whereby the valve assembly may be reelasably locked in place in the conduit through a collar, pipe coupling or other tubular member.

It is another object of the invention to provide a novel and releasable locking device which may be effectively used for locking any type of valve assembly in place in a conduit.

Figure 1:
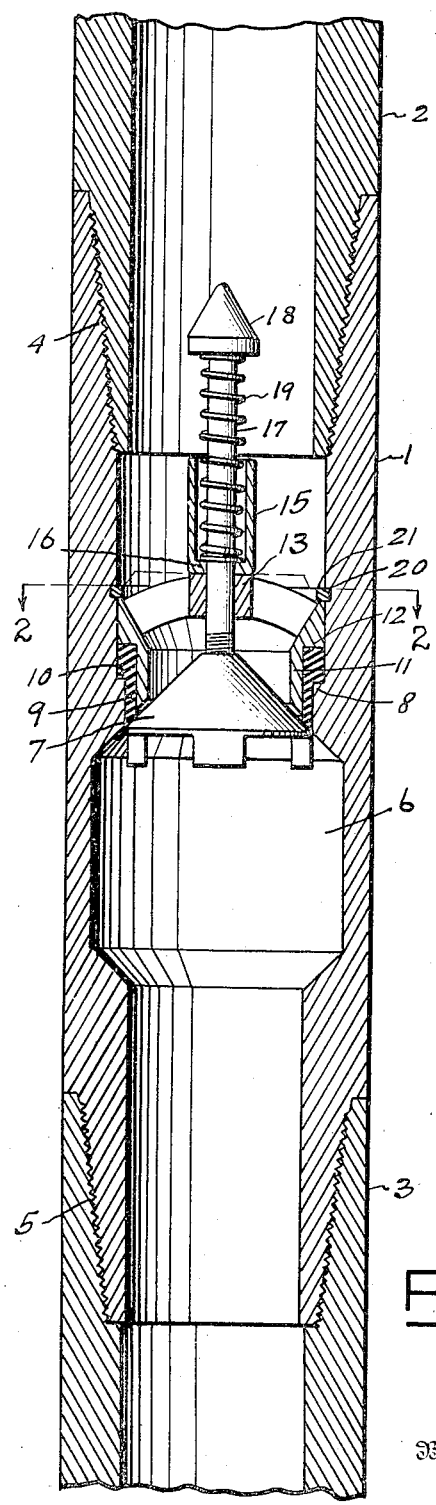
Figure 2:
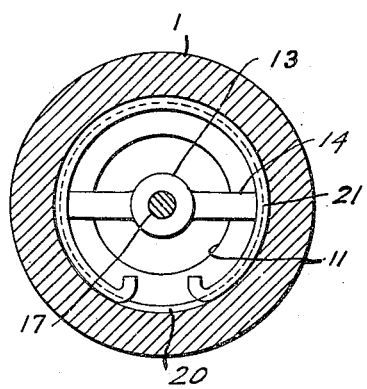

With the above and other objects in view, the invention has particular relation to certain novel features of construction, operation and arrangement of parts, an example of which is given in this specification and illustrated in the accompanying drawing, wherein:

Figure 1 shows a vertical sectional view of a coupling showing the valve mechanism locked in operative position, and Figure 2 shows a cross sectional view taken on the line 2—2 of Figure 1.

Referring now more particularly to the drawing, wherein like numerals of reference designate similar parts in each of the figures, the numeral 1 designates a coupling member adapted to be interposed between the connected sections or parts 2 and 3 and to be connected thereto by means of standard threads 4, 5. The coupling member 1 has an enlarged inside cavity 6, both ends of which are annularly beveled as shown. Above the cavity 6 the inside diameter of the coupling 1 is reduced to a bore which is only slightly larger in diameter than the upwardly tapering valve 7. Above the cavity 6 the bore through the coupling member 1 is enlarged forming an annular upwardly facing inside shoulder 8. A resilient valve seat 9, tubular in form, is fitted downwardly through the bore of this coupling member 1 and the upper end of this seat is externally enlarged forming the downwardly facing shoulder 10 which rests on the shoulder 8. The seat 9 is shaped to fit snugly within the bore of the coupling member 1 and its lower end is flared outwardly and flush with the tapered wall at the upper end of the recess 6 so that the upwardly tapering surface of the valve 7 will fit closely against the lower end of the seat 9 when the valve is in closed position.

There is a tubular spider 11 formed of rigid material which is fitted downwardly into the upper end of the seat 9 and whose upper end is enlarged to fit closely within the bore of the joint 1 thus forming an external annular shoulder 12 which rests on the upper end of the seat 9. The lower end of the spider is outwardly flared and spaced slightly above the tapering surface of the valve 7, when the valve is closed, to allow for resilient expansion of the seat under pressure of the valve.

The upper end of the spider has a centrally located bearing 13 which is anchored in place by the arms or bridges 14, which may be formed integrally with the spider and with the bearing 13.

On the bearing 13 there is a spring housing 15 whose lower end is inwardly thickened forming a flange 16.

Upstanding from the valve 7 there is a valve stem 17 which works through the bearing 13 and which is closely surrounded by the flange 16 and the upper end of the stem 17 is formed with a conical head 18. A coil spring 19 closely surrounds the stem 17. The flange 16 forms a spring seat and the spring is interposed between said seat and the head 18 and is surrounded by the housing 15. The spring normally maintains the valve 7 in closed position.

The wall of the bore through the coupling 1 is provided with an inside annular groove 20 above the valve assembly. This groove is provided to receive a lock spring 21. This spring is substantially circular in shape but is open at one side as more clearly shown in Figure 2 with its free ends inwardly turned. Its inside diameter is somewhat less than the inside diameter of the bore of the coupling member 1 and also less than the maximum outside diameter of the spider 11 so that when it is inserted into place, it will lock against the upper end of said spider.

In assembly the valve 7 may be fitted against the lower end of the seat 9 and the spider and spring housing assembled with the spider fitted into the seat as shown in Figure 1. The stem 17, with the spring thereon, may then be fitted downwardly through the bearing 13 and screwed into the top of the valve so as to give the spring the desired compression to hold the valve closed. The valve mechanism, as thus assembled, may then be inserted into the coupling 1 before the section 2 is screwed into place. The lock spring 21 may then be contracted and inserted downwardly through the bore of the coupling member 1 and when it registers with the groove 20 it will expand and seat itself in said groove and will thereafter lock against the upper end of the cage so as to maintain the valve assembly securely in place.

Upon disconnection of the section 2 the lock spring 21 may be readily contracted and removed and the valve assembly lifted out as a unit. The inwardly turned ends of the lock spring 21 form convenient means for the engagement of a hand implement therewith such as a pair of pliers for contracting and removing the lock spring.

Obviously the invention is susceptible of embodiment in forms other than that which is illustrated and applicable for uses and purposes other than as detailed, the drawing and description being intended merely as a disclosure of what is now considered a preferred form of the invention while the broad principle of the invention will be defined by the appended claim.

What I claim is:

The combination with a tubular member having an inside upwardly facing shoulder, a valve assembly bodily insertable into the member onto said shoulder and bodily removable from said member, said assembly including a tubular resilient valve seat mounted for enagement with said shoulder, a tubular spider fitted through the seat and having an external shoulder which rests on the seat, said tubular member having an inside annular groove, an expansible locking ring open at one side and having its free ends overturned, said ring being insertable in the groove for engagement with the upper end of the spider to retain the assembly in the tubular member, said groove being so positioned that the ring therein, when engaged with the spider will hold the spider tightly against the resilient seat to hold the same under compression, said valve assembly also including a downwardly opening valve member yieldingly supported on the spider, said valve member including a valve stem threaded on its lower end for threaded engagement with a valve member.

WALTER BRAUER.